Oct. 25, 1955 E. D. SHANK ET AL 2,721,482
STARTER CLUTCH
Filed March 24, 1954
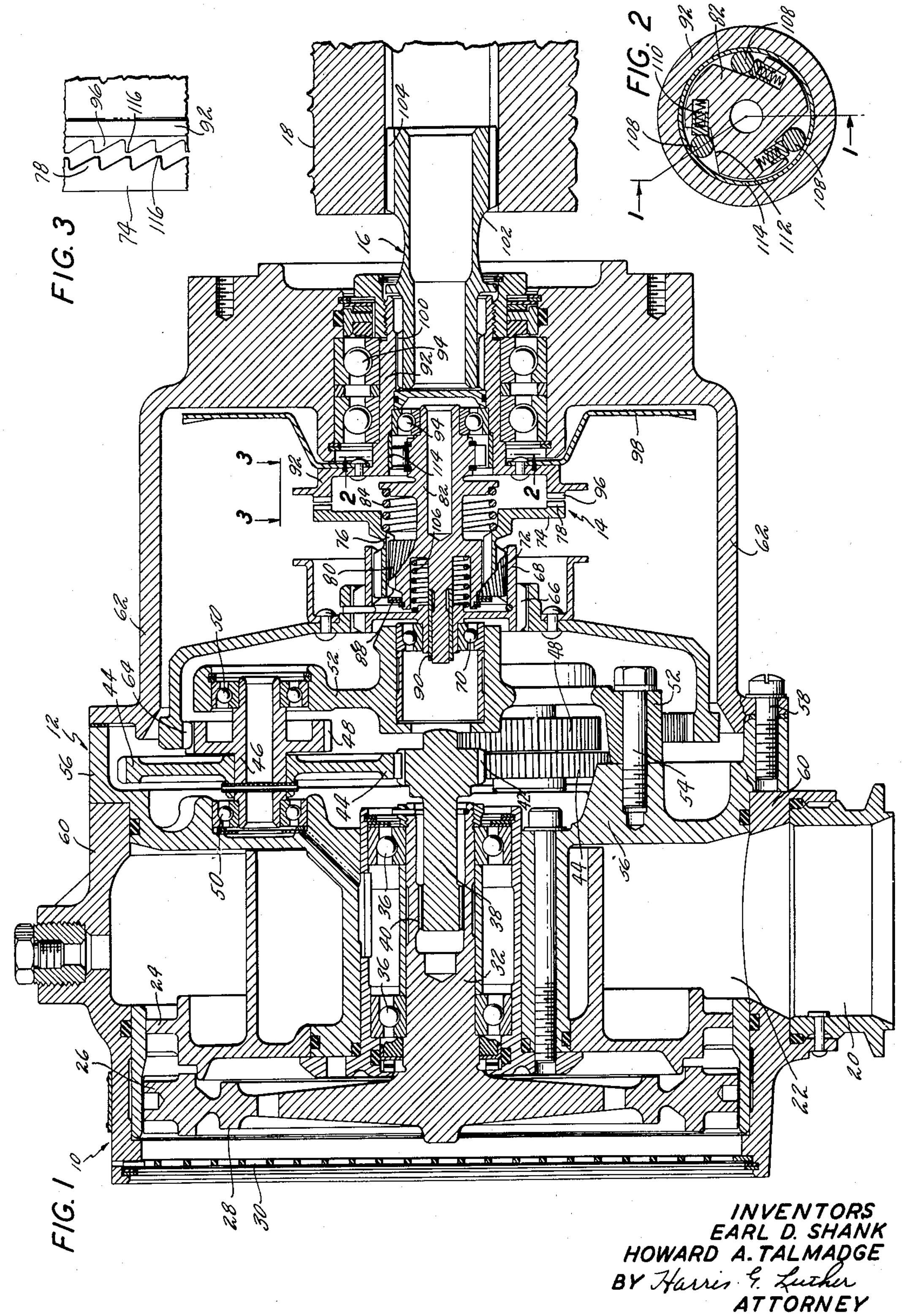
INVENTORS
EARL D. SHANK
HOWARD A. TALMADGE
BY Harris G. Luther
ATTORNEY United States Patent Office 2,721,482

Patented Oct. 25, 1955

1

2,721,482

STARTER CLUTCH

Earl D. Shank, Cumberland, Md., and Howard A. Talmadge, Canton, Conn., assignors to United Aircraft Corporation, East Hartford, Conn., a corporation of Delaware Application March 24, 1954, Serial No. 418,332

14 Claims. (Cl. 74—7)

This invention relates to engine starters and particularly to the starter clutch mechanism.

An object of this invention is mechanism which will quickly engage the toothed starter clutch contained within the starter housing.

A further object is mechanism which will mesh the clutch teeth of a high speed starter with a minimum of impact loading.

A still further object is mechanism for relatively shifting the clutch teeth to cause them to mesh in the event the teeth tops contact in the engagement movement.

Other objects and advantages will be apparent from the following specification and the attached drawing in which:

Fig. 1 is a longitudinal section of a starter showing the improved clutch mechanism;

Fig. 2 is a cross section of the free-wheeling clutch along the line 2—2 of Fig. 1;

Fig. 3 is a view along the line 3—3 of Fig. 1 showing the clutch teeth.

In powerful high-speed starters such as might be used for starting gas turbine engines and in which the toothed or jaw clutch is engaged for transmitting the power from the starter to the engine, the starter driven portion of the clutch may attain such a high speed before it is forced into engagement with the stationary portion of the toothed or jaw clutch attached to the engine that serious impact loads may be imposed at the clutch teeth particularly if the movable portion of the clutch is allowed to accelerate a sizable angular distance before the teeth are brought into engagement. In the present application mechanism is described by means of which the jaw teeth may be brought into engagement with a minimum of impact loading and may be quickly forced into complete tooth engagement.

In the mechanism used to illustrate this invention, which is an improvement on the device disclosed in Orbeck application Ser. No. 297,228, filed July 5, 1952, and which is now considered to be the preferred embodiment, the starter comprises a power section indicated generally at 10, a reduction unit indicated generally at 12, a clutch unit indicated generally at 14 and a member indicated generally at 16 for driving the power plant which is indicated generally at 18. The power unit 10 comprises an intake opening 20 which leads to an annular chamber 22 and into which pressurized gases are admitted through the intake opening 20. The gases may be compressed air, high temperature combustion products or gases from any form of gas generator. Fluid from chamber 22 is directed by a plurality of nozzles 24 against blades 26 of a turbine rotor 28. The gases discharged from the turbine pass through outlet screen 30. The turbine rotor 28 forms an integral part of a shaft 32 which is mounted centrally of the starter by means of ball bearings 36.

A stub shaft 38 is splined at one end at 40 to shaft 32 and carries a gear 42 at its opposite end. Gear 42 meshes with a plurality of gears 44, only one of which is shown in Fig. 1. Gear 44 is pinned to a shaft 46 carrying a gear 48 and supported in bearings 50.

2

Bearings 36 and 50 are supported in the starter housing which is built up of a plurality of bolted-together sections. Section 52 which carries one of the bearings 50 is bolted by bolt 54 to section 56 which is bolted by bolts 58 and others not shown to sections 60 and 62. Shaft 46 carrying gears 44 and 48 is therefore supported at both ends in the fixed housing for rotation about its axis. Gear 48, of which there are a plurality although only one is shown in Fig. 1, meshes with internal gear 64 which is splined at 66 to sleeve 68 which is supported in housing member 52 by bearings 70. Sleeve 68 is connected by left hand helical splines 72 to movable clutch member 74. Movable clutch member 74 carries, in addition to external left hand helix 72, an internal right hand helical spline 76 and clutch teeth 78. The internal helical spline 76 of clutch member 74 meshes with right hand helical spline 80 on stub shaft 82 to thus support the clutch member 74. Clutch member 74 is urged to the left, as viewed in Fig. 1, against a stop 88 carried by shaft 82, by a spring 84 arranged between the clutch member 74 and a flange 86 on shaft 82.

Stub shaft 82 is rotatably and slidably supported at one end in section 52 by a bearing 90, sleeve 68 and bearing 70 and at the other end in the other clutch member 92 by bearing 94. Clutch member 92 is supported in housing section 62 by bearings 94 and carries clutch teeth 96 and an oil slinger 98 for distributing oil maintained in starter housing in order to provide an oil mist and lubricate the various moving parts of the starter. Clutch member 92 is internally splined at 100 to connecting shaft 102 which is splined at 104 to a portion 18 of the turbine to be driven by the starter.

Stub shaft 82 is urged to the right, as viewed in Fig. 1, by a spring 106. A free-wheeling or one-way clutch connects stub shaft 82 with clutch member 92 and comprises rollers 108 urged by springs 110 along surfaces 112 on stub shaft 82 into contact with a bearing sleeve 114 secured in clutch member 92.

The jaw clutch teeth 78, 96 may be of saw-toothed form, as shown in Fig. 3, having lands 116 on the tops thereof.

Rotation of turbine rotor 28 by pressurized gases will, through gear reduction 42, 44, 48, 64, rotate the sleeve 68 in a clockwise direction, as viewed from the left hand end of Fig. 1, in the structure selected to describe the present invention. Rotation of sleeve 68 will, through the left hand helical splines 72, rotate clutch member 74. Rotation of clutch member 74 will, through right hand helical splines 76, 80, try to rotate stub shaft 82 which will, through one-way clutch 108, try to rotate clutch member 92 and connector 102 and turbine part 18. Part 18 will present so much resistance to turning, which resistance will be transmitted back through one-way clutch 108 to stub shaft 82 and act as a resistance to turning shaft 82, that the turning force applied to clutch member 74, assisted by the axial component of the force on splines 72, will slide clutch member 74 along the right hand spiral splines 76, 80, compressing spring 84 and forcing the clutch teeth 78, 96 into engagement before any material relative rotation is attained between the clutch member 74 and the clutch member 92. The angle of the right hand helix is selected (allowance being made for the difference in diameters of the helical spline and the clutch teeth) with respect to the angle of the inclined portion of the clutch teeth 78, 96 so that as the clutch member 74 advances, it could make a full tooth engagement. However, if the initial engagement of the toothed clutch is not the full tooth face, the axial component of the tangential forces at the left hand helical spline 72 is sufficient to overcome friction in the tooth engagement and the force from the disengaging spring 84, and therefore, will urge movable clutch member 74 axially into full toothed engagement. Thi
by any relative
92, causes the
splines 76, 80,
from the left
axial compone
ment with clut
and 94 once ful
In the event
should engage
96 on clutch
member 74 to
when viewed
move slidably
left against the
movement of
on sleeve 114,
viewed from
84 and 106
simultaneous
member 74 p
off of the lan
96 until the re
engaged.
Clutch me
times with tu
turbine, is co
free-wheeling
92, will also
ation. It has
clutch rolls 1
wheel" witho
From the
is free to flo
the three gea
shaft 38, me
64 is sufficie
load delivere
ternal gear 6
The housin
ing so that
in the interio
62 thereof to
various rotati
From the
have provide
are all inside
oil and in w
any material
two toothed
that we have
turbine is con
clutch to the
wheeling clu
the toothed
engine durin
While onl
it will be ap
tions can be
of the vario
of this novel
We claim:
1. A one-
driving mem
ing two clut
driven mem
being of a
type and the
disengageabl
driving relat
the parts of
comprising a
member wit
axially movi
application con-
ovable
urging
mbers
en ele-
rotary
y con-
secur-
ement,
member
ry and
it with
ng said
hereby
ns will
driving
ber to
clutch
ns and
ember.
forcing
shaft
member
h by a
mem-
member.
shaft is
le axi-
of said
to said
angular
driving
adapted
rotary
onnect-
eve co-
cluding
driven
ng said
l sleeve
of said
driving
adapted
ith the
rivingly
reof, a
necting
lement,
ponent
ne-way
of said
for re-
relative
driving
adapted
e rotary
necting
oaxially
spiral
member,
ncluding
sleeve,
aft with
nd said
ovement
ry driv-
ent and
ent with the rotary member, cooperating mechanism for drivingly connecting said members upon engagement thereof, a sleeve coaxially disposed within said driven member, including spiral teeth engaging cooperating teeth on said driven member and inclined in a direction to urge said driven member axially toward said rotary member when driven by said driving element, and a one-way drive means connecting said sleeve with said rotary member for restraining said sleeve against rotation to cause relative axial movement of said driven member.

11. In a starter for a rotary member, a rotary driving element, a member driven by said element and adapted to be moved along its axis for engagement with the rotary member, cooperating mechanism for drivingly connecting said members upon engagement thereof, a sleeve coaxially disposed within said driven member including spiral teeth engaging cooperating teeth on said driven member and inclined in a direction to urge said driven member axially toward said rotary member when driven by said driving element, a shaft coaxially disposed within said sleeve including spiral teeth engaging cooperating teeth on said sleeve and inclined in a direction to urge said driven member axially toward said rotary member when driven by said sleeve, and a one-way drive means connecting said shaft with said rotary member for restraining said shaft and said sleeve against rotation to cause relative axial movement of said driven member.

12. In a starter for an engine having an element to be driven by the starter, a unidirectional rotatable power device for energizing the starter including a first rotatable member having helical teeth, a second member having a first set of helical teeth and engaging the teeth of said first member for rotation therewith and axial movement thereby, a third member adapted to be engaged and driven by said second member upon axial movement thereof and connected with said driven element, cooperating members for drivingly connecting said second and third members upon engagement thereof, a second set of helical teeth on said second member, a shaft having helical teeth engaging said second set of helical teeth and arranged to move said second member axially into engagement with said third member, a one-way clutch connecting said shaft with said third member, spring means urging said second member out of engagement with said third member.

13. In an engine starter, a housing, a rotary driving element in said housing, a driven member extending outside said housing and adapted to be positively and continuously connected with a rotating engine part during engine starting and running, a two part jaw clutch inside said housing and having one part connected with said driven member, a first spring means separating said clutch parts, a first spiral toothed connection between said rotary driving element and the other part of said jaw clutch, comprising concentric meshing external and internal tooth members, for rotating said other part and forcing said other part axially, in opposition to said first spring means, into driving engagement with said one part, a one-way roller type clutch inside said housing having a driven portion connected with said driven member and having a driving portion, a second spring means urging said driving portion axially in one direction, a second spiral toothed connection between said jaw clutch other part and the driving portion of said one-way clutch for rotating said driving portion and forcing said jaw clutch other part axially, in opposition to said first spring means, into driving engagement with said one part, or rotating said other part and forcing said driving portion axially, in opposition to said second spring means, when the torque applied to said one-way clutch through said second connection and said driving portion exceeds a predetermined limited amount.

14. In an engine starter having a driving element and a driven engine engaging member, a continuously engaged one-way clutch having a driving side adapted to be connected to said driving element and a driven side connected to said driven member, a second clutch for transmitting torque from the driving element to the driven member and having one part connected with said driven member, means separating said second clutch parts, a rotary drive connection having a tangential and an axial force component connecting said driving element to the other part of said second clutch for rotating said other part and for forcing said other part into driving engagement with said one part of said second clutch, a second rotary drive connection having a tangential and an axial force component connecting said other part to the driving side of said one-way clutch for rotating said driving side and for forcing said other part into driving engagement with said one part of said second clutch and forcing said driving side of said one-way clutch axially upon application of a predetermined limited torque through said second drive connection to said driving side, said second drive connection acting to axially force the two parts of the second clutch into driving engagement or to rotate said other part relative to said one part to bring the two parts of said second clutch into driving engagement while transmitting a limited torque to the one-way clutch, said first drive connection acting to force said other part axially into complete driving engagement with said one part after initial partial driving engagement, said last mentioned axial movement acting through said second drive connection to relieve said driving clutch of all driving torque.

References Cited in the file of this patent

UNITED STATES PATENTS 2,156,667 Nardone -------------- May 2, 1939